United States Patent [19]

Naito

[11] Patent Number: 5,025,431

[45] Date of Patent: Jun. 18, 1991

[54] AUTOCHANGER OF WRITABLE DISCS

[75] Inventor: Ryuichi Naito, Saitama, Japan

[73] Assignee: Pioneer Electronic Corporation, Tokyo, Japan

[21] Appl. No.: 243,960

[22] Filed: Sep. 14, 1988

[30] Foreign Application Priority Data

Sep. 14, 1987 [JP] Japan .............................. 62-230196

[51] Int. Cl.$^5$ ........................... G06F 9/46; G11B 7/00
[52] U.S. Cl. ........................................ 369/36; 369/34; 369/178; 364/238.4; 364/200; 364/249.4
[58] Field of Search ............... 369/34, 35, 36, 192, 369/178, 202, 201; 364/200, 240.5, 238.4, 245, 249.4, 246.92, 249.6; 360/92

[56] References Cited

U.S. PATENT DOCUMENTS

| 4,675,755 | 6/1987 | Baumeister et al. | 369/34 |
| 4,695,946 | 9/1987 | Andreasen et al. | 364/200 |
| 4,934,823 | 6/1990 | Okami | 364/200 |

*Primary Examiner*—William M. Shoop, Jr.
*Assistant Examiner*—John W. Cabeca
*Attorney, Agent, or Firm*—Sughrue,Mion,Zinn,Macpeak & Seas

[57] ABSTRACT

An autochanger of writable discs automatically transfers a write-once optical disc between a disc accommodation unit and a recording/reading device where data are recorded into the optical disc and read from that. In order to shorten a disc loading time, address information of sectors in which the latest defect management information is stored is written into an erasable non-volatile memory IC and renewed when a new defect sector is found in the optical disc.

7 Claims, 3 Drawing Sheets

| CONTROL TRACKS | TRACK NUMBER | | | |
|---|---|---|---|---|
| MAP AREA #1 | 1 | ~ | 4 | (4 TRACKS) |
| MAP AREA #2 | 5 | ~ | 8 | (4 TRACKS) |
| ⋮ | | | | |
| MAP AREA #62 | 245 | ~ | 248 | (4) |
| MAP AREA #63 | 249 | ~ | 252 | (4) |
| USER AREA #1 | 253 | ~ | 566 | (314) |
| REPLACEMENT AREA #1 | 567 | ~ | 570 | (4) |
| USER AREA #2 | 571 | ~ | 884 | (314) |
| REPLACEMENT AREA #2 | 885 | ~ | 888 | (4) |
| ⋮ | | | | |
| USER AREA #61 | 19333 | ~ | 19646 | (314) |
| REPLACEMENT AREA #61 | 19647 | ~ | 19650 | (4) |
| USER AREA #62 | 19651 | ~ | 19992 | (342) |
| REPLACEMENT AREA #62 | 19993 | ~ | 19996 | (4) |
| REPLACEMENT AREA #63 | 19997 | ~ | 20000 | (4) |

AUTOCHANGER OF WRITABLE DISCS

BACKGROUND OF THE INVENTION

The present invention relates to an autochanger of writable discs.

FIG. 4 shows a conventional autochanger of writable discs. In this figure, a writable disc of, for example, a write-once type optical disc 1 is a large capacity disc medium having storage capacity of several hundred mega-bytes to several giga-bytes per one disc and several discs to several hundred discs are accommodated in order in a disc accommodation unit 2. In the predetermined area of the optical disc 1, defect management information showing addresses of defective sectors in the optical disc 1 and addresses of replacement sectors for the defective sectors is recorded. A loading mechanism 3 automatically picks up the predetermined optical disc contained in the disc accommodation unit 2 and transfers the picked-up optical disc to apply it to a recording/reading device 4, automatically removes the optical disc from the recording/reading apparatus 4 and returns it to the disc accommodation unit 2. The recording/reading device 4 records information into the optical disc installed therein and reads the information recorded on the optical disc. A plurality of the recording/reading devices 4 may be used in the autochanger.

A controller 5 consists of a microcomputer and performs such operations according to commands supplied from a host computer 6 through an interface 7 (SCSI or the like) as; controlling the loading mechanism 3 so as to load the suitable optical disc from the disc accommodation unit 2 to the recording/reading device 4, controlling the recording/reading device 4 so as to record the information supplied from the host computer 6, and reversely controlling the recording/reading device 4 so that the recorded information is read out of the optical disc and transferred to the host computer 6. The controller 5 contains a RAM (random access memory) for storing defect management information of the optical disc.

When a new optical disc has been installed in the recording/reading device 4 in response to the commands sent from the host computer 6, the controller 5 instructs the recording/reading device 4 so as to read the defect management information recorded in the predetermined area of the optical disc and writes the read-out defect management information into the RAM 8 in the controller 5. After that, when the controller 5 receives the command sent from the host computer 6 ordering to read the information recorded in the optical disc, the controller 5 judges from the defect management information in the RAM 8 whether the designated sectors are replaced by other sectors through the occurrence of defective sectors and gives the recording/reading device 4 an instruction to read suitable sectors. If a defective sector is detected when the writing operation is carried out according to the writing command, the controller 5 rewrites the information to a suitable replacement sector on the basis of the defect management information stored in the RAM 8, writes a new defect management information into a suitable sector, and simultaneously renews the data in the RAM 8 to the latest defect management information.

As described above, in the conventional autochanger it is necessary to read the defect management information from the optical disc every time the disc is installed into the recording/reading device 4. Therefore, it takes additional time corresponding to reading the defect management information to install the optical disk. The reason for necessitating the extra time to read out the defect management information will be described in the following.

FIG. 5 is an explanatory diagram of an example of a defect management method for a write-once type optical disc with a diameter of 130 mm. There are 20,000 tracks (track numbers are 1 to 20,000) in the disc and these tracks are used for a map area, a user area, or a replacement area. One track consists of 32 sectors and each sector has capacity of 512 bytes.

The user area is originally used by the user to write data into it and read data out of it. The replacement area is used to rewrite the data of the sector which is judged as a defective sector in verification reading performed immediately after the data have been written into the user area. A defective sector means a sector which has micro-defects, so that the data previously written can not be read out with a prescribed signal quality. The map area is used to write the defect management information which indicates the correspondence between the defective sectors in the user area and the replacement sectors in the replacement area.

The disc memory area can be divided into a plurality of bands consisting of at most 63 bands. Basically, each band has a map area, a replacement area and a user area. However, as described below, there exists a band which does not have a user area. The map area and the replacement area of each band are determined to have four tracks (128 sectors), respectively, but the number of tracks in each user area is not fixed. Also there is not determined the position of the first track of each area of each band. The number of tracks in each user area and the positions of the first tracks may be designated by the user or by the controller automatically. In order to memorize the above information, there are provided control tracks with the fixed track numbers (except for 1 to 20,000) in the disc.

FIG. 5 shows an example of a format of the band division and the track numbers of each area of the disc memory area. As shown in FIG. 5, the disc memory area is divided into the bands of #1 to #63. The bands of #1 to #62 have respective user areas and the band #63 does not have a user area. Each user area of the bands #1 to #61 consists of 314 tracks and the user area of the band #62 has 342 tracks so as to adjust the fractions.

When data are written in a certain sector in the user area #1 and the sector is judged to be defective in the verification reading carried out just after the writing, the same data are again written into the sector with the smallest address number among non-written sectors in the replacement area #1. This replacement sector is also subjected to verification reading. When it is a defective sector, the data are again written into the right next sector. In this manner, the same data is written into the sector in the replacement area #1 repeatedly until the sector without defect is found in the verification reading. As a result, one sector in the replacement area #1 is given to one defective sector in the user area #1. One pair of addresses of these two sectors constructs one defect management information and this information is written into the sector with the smallest address number among non-written sectors in the map area #1. This sector in the map area #1 is also subjected to the verification reading. When this sector is found to be a defective sector, the data are again written in the right next sector. In this way, the same data (defect management information) is written into the map area #1 until the sector without defect is found in the verification reading.

The same procedure is carried for the bands #2 to #62. The band #63 is provided for the case of overflowing in the map area or in the replacement area of the bands #1 to #62. Therefore, the band #63 does not have a user area.

Construction of the map area will be explained in the following. One sector (512 bytes) in the map area is divided into 128 fields, with each field having four bytes. Three bytes in one field show the defective sector address in the user area and the remaining one byte shows the specific sector of 128 sectors in the replacement area, by which specific sector the defective sector in the user area is replaced. Therefore, the one sector in the map area can contain at the maximum 128 of defect management information and it is identical with the number of 128 sectors in the replacement area provided in one band, so that only one sector in the map area can contain all the defect management information of the corresponding band. When the data in a certain band are overflown, the band #63 as the common overflowing area is used to store the overflown data.

As data-rewriting cannot be performed in the write-once type optical disc, when one defect management information is generated in a certain band, it is unavoidable to consume one sector in the map area, into which sector the defect management information is written. When the defective sector is found at the first time in a certain band, the data describing the defect management information are written into the first field (4 bytes) of the leading sector in the map area of that band. And when the next defective sector is found, the same data describing the first found defect management information are written into the first field of the second sector and the data describing the newly found defect management information are written into the second field of the second sector (the second field of 4 bytes) in the map area, since the data in the leading sector of the map area cannot be rewritten.

As is understood from the above explanation, the latest defect management information in a certain band exists in the last written sector in 128 sectors in the map area of that band. Needless to say, the latest defect management information is necessary when reading the data out of the user area. Moreover, when a new defective sector is found in writing the data; without the latest defect management information it is uncertain into which sector in the replacement area the data should be rewritten, and without the knowledge of the sector address in the map area storing the latest defect management information it is also uncertain into which sector in the map area the next defect management information should be written.

Therefore, the following operations are needed when a disc is loaded in the recording/reading device. Firstly, the control tracks in the disc are read to know the track numbers of the map area of each band. Secondly, the last-written sectors are found out for all map areas and the latest management information of each band is read out of that sector. Finally, those of latest management information are written into the RAM.

Next, the time necessary to read the defect management information will be explained. If the rotation speed of the disc is 1,800 r.p.m., the time for one rotation of the disc is about 33 msec. Presuming that a considerable portion of the map area of each band has been consumed, it is hard to expect shortening the time by employing the process of finding the last-written sector in the map area of a certain band and immediately after that accessing to the map area in the next band. Eventually, there is no other way than reading all the map area of the disc according to the revolution of the disc. The total number of the tracks in the map areas is 252, so that 8.4 seconds are consumed to read all tracks in the map areas.

As in the autochanger for optical discs the disc-loading time is one of the important performances, the operating speed of the disc-loading mechanism must be made higher. However, in accordance with the prior art, more than 8 seconds of time is necessary as described above to read the defect management information, resulting in the disadvantage of increasing the disc-loading time.

SUMMARY OF THE INVENTION

Accordingly, an object of the present invention is to provide an autochanger of writable discs which can greatly reduce the substantial disc-loading time.

An autochanger of writable discs according to the present invention comprises: a disc accommodation unit for accommodating in order a plurality of writable discs, in each disc being recorded defect management information which indicates an address of a defective sector in the disc and an address of a replacement sector for the defective sector by sequentially using sectors in predetermined areas; a recording/reading device for recording data into the disc and reading recorded data from the disc by accessing to prescribed addresses of the disc with referring to the latest defect management information; a loading mechanism for automatically transferring the disc between the disc accommodation unit and the recording/reading device; a controller for controlling the loading mechanism, the recording/reading device and an erasable non-volatile memory means; and the erasable non-volatile memory means; wherein in the process where the disc is applied to the accommodation unit, addresses of sectors where the latest defect management information of the disc is stored are written into the non-volatile memory means, and the addresses of those sectors are renewed when a new defect management information is generated in writing data into prescribed addresses of the disc.

Other and further objects, features and advantages of the invention will appear more fully from the following description taken in connection with the accompanying drawings.

DETAILED DESCRIPTION OF THE PREFERRED EMBODIMENTS

Embodiments of the present invention will be described with reference to the accompanying drawings.

Figure 1:
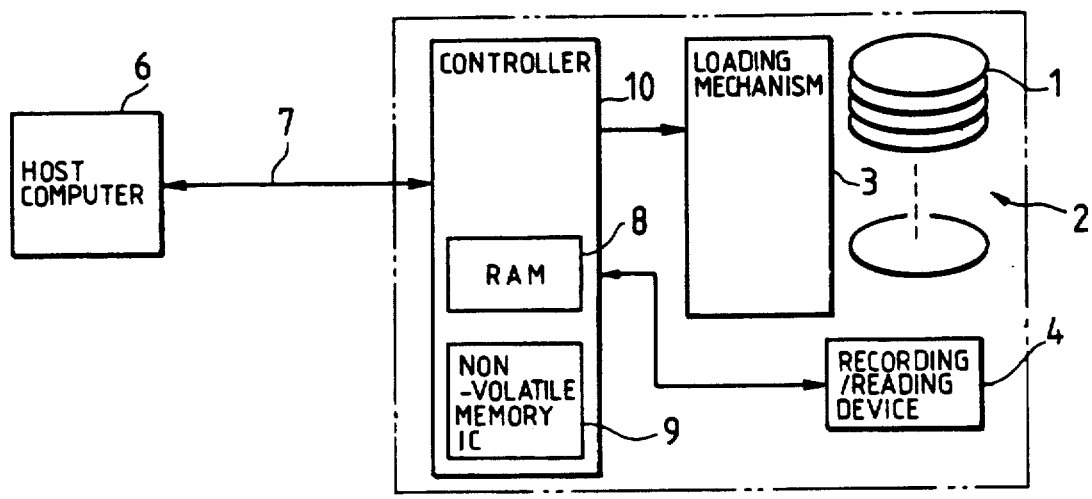
FIG. 1 is a block diagram showing an embodiment of the present invention.
Figures 4, 5:
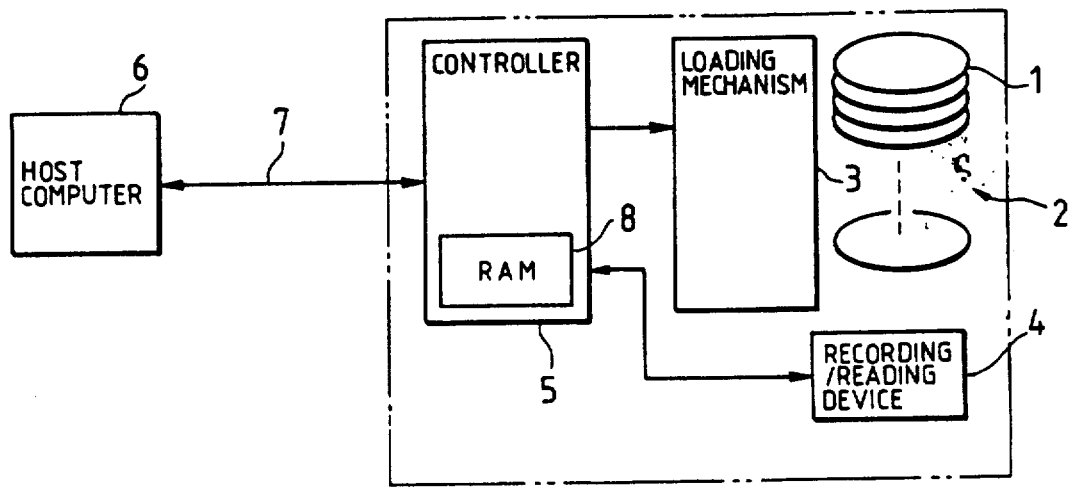
FIG. 4 is a block diagram showing a conventional disc autochanger.
FIG. 5 is a diagram depicting a format of band division of a disc memory area and track numbers in each area.

FIG. 1 is a block diagram showing one embodiment of an autochanger of writable discs according to the present invention. In FIG. 1, blocks or parts which are the same as those shown in FIG. 4 are identified by like reference numerals and redundant explanation will be omitted.

The controller 10 shown in FIG. 1 is equipped with a non-volatile memory IC 9 into which new information can be rewritten (in other words, erasable). As the non-volatile memory IC 9 such devices, as a PROM which is electrically erasable and a RAM which is backed up with a battery, can be employed. The non-volatile memory IC 9 may be installed as an external circuit of the controller 10. Addresses of the last written sector among the 128 sectors in the map area of each band are written into the non-volatile memory IC 9. For all bands of one optical disc, the address information of 63 bytes (1 byte × 63 bands) are written into the memory IC 9. Therefore, if the number of the optical discs contained in the disc accommodation unit 2 is, for example, about 50, the non-volatile memory IC 9 having capacity of about 1.3 kilobytes is made necessary.

Figure 2:
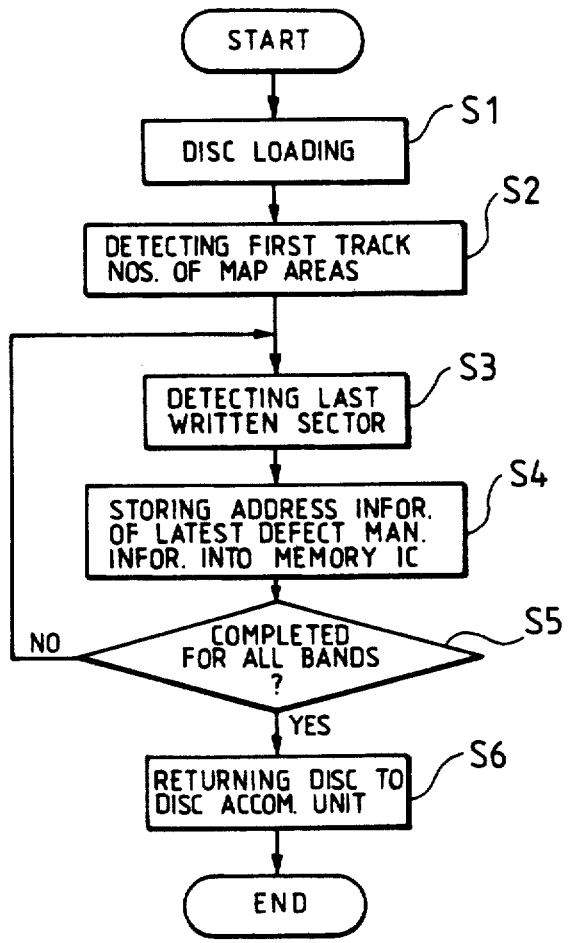
FIGS. 2 and 3 are flow charts depicting processing steps to be carried out by a processor of the controller shown in FIG. 1.
Figure 3:
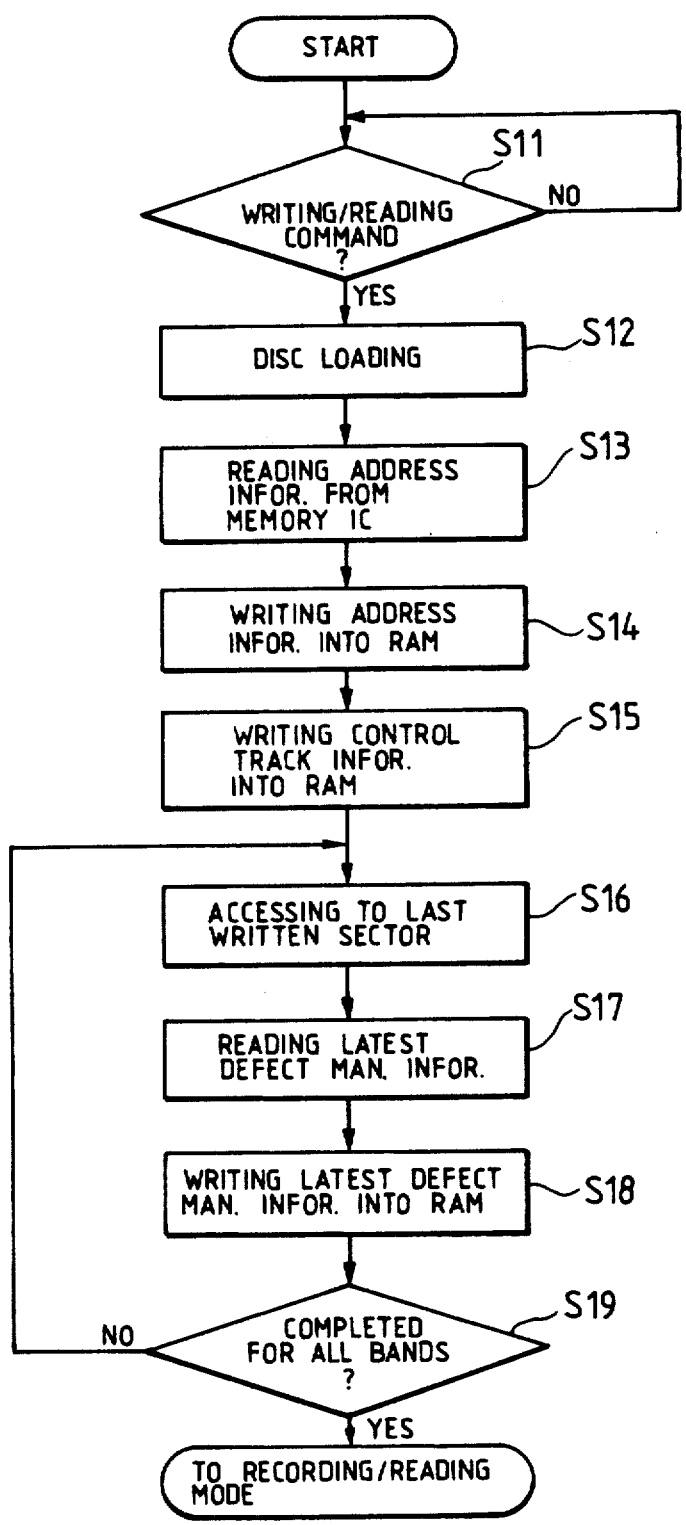

The processing steps to be carried out in the processor of the controller 10 of the autochanger which is provided with the memory IC 9 as the erasable non-volatile memory means will be explained with reference to the flow charts shown in FIGS. 2 and 3.

First, the processing steps for accommodating the optical disc into the disc accommodation unit 2 will be described with reference to FIG. 2. The processor controls the loading mechanism 3 in order to transfer the optical disc from the disc accommodation unit 2 into the recording/reading apparatus 4 (Step S1) and then controls the recording/reading apparatus 4 in order to read the information stored in the control tracks of the optical disc (Step S2). As a result of this procedure, the first track numbers of the map areas of all bands in the optical disc are known. Next, the processor controls the recording/reading device 4 in order to in turn read 128 sectors in the map area of a certain band (Step S3), thereby finding the last written sector. Then, the processor stores into the non-volatile memory IC 9 address information indicating the position of the last written sector in the map area (Step S4). This step is carried out for all bands. After the Step S4 is found to be completed for all bands at the Step S5, the optical disc is returned to the disc accommodation unit 2 at Step S6. It is needless to say that the steps mentioned above are necessary only when the optical disc is newly accommodated into the disc accommodation unit 2.

FIG. 1 does not show any means for designating the optical disc in the disc accommodation unit 2, for which disc the above steps are going to be carried out. For example, the operator may designate the optical disc manually by means of an input means, such as a push button. It is also possible to install a detecting means, for example a microswitch or the like, in the places of the disc accommodation unit 2 which contains the optical discs in order to automatically judge the optical disc to be executed.

Next, the processing steps shown in FIG. 3 for writing data into the optical disc or reading the stored data out of the optical disc will be explained. When the processor receives a command from the host computer 6 instructing to write the data into the designated optical disc or read the stored data out of the designated optical disc (Step S11), it controls the loading mechanism 3 to transfer the designated optical disc to the recording/reading device 4 (Step S12), reads the address information of the last written sectors with respect to the designated optical disc from the non-volatile memory IC (Step S13) and stores the read-out address information into the RAM 8 (Step S14). If the system works with the address information being remained in the non-volatile memory IC 9, the Step S14 can be eliminated.

Next, the processor controls the recording/reading device 4 so as to read the information stored in the control tracks of the optical disc and to write the read-out information into the RAM 8 (Step S15). After the completion of the foregoing steps the following information has been written into the RAM 8 of the controller 10 for all bands of the designated disc: the first track of every area, and the address information of the last written sectors in the map areas.

Next, the processor controls the recording/reading device 4 on the basis of the above information so as to access to the last written sector in the map area of one band (Step S16), read the latest defect management information out of the above last written sector (Step S17), and write the read-out latest defect management information into the RAM 8 (Step S18). These steps (S16 to S18) are repeated for all bands. When these steps have been completed for all band (Step S19), the process is shifted to a usual recording/reading mode.

The time consumed in the Steps S16 to S19 will be described in the following. In an optical disc driver the access time to the prescribed sector is generally defined as the sum of a seeking time (a time taken to reach the prescribed track) and an average rotation-waiting time which follows the seeking time. The seeking time is classified into two cases: the first case where the track is considerably far from the present track is sought, and the second case where the track adjacent to the present track is sought. In the first case the seeking time (average seeking time) is generally a little less than 100 msec. In the second case the seeking time is generally about 1 msec. The average rotation-waiting time in a condition of 1,800 r.p.m. is approximately 16.7 msec. On the other hand, the time consumed to actually read the information out of the prescribed sector is about 1 msec in the case where 32 sectors are included in one track.

Now, the above discussion is applied to the embodiment under consideration. Applying the average seeking time from the control track, the access time consumed to read the information stored in the last written sector in the first map area (map area #1) is calculated as:

100 msec + 16.7 msec + 1 msec = 117.7 msec.

As for the remaining map areas #2 to #63, considering that one area consists of 4 tracks and therefore applying 4 times the seeking time for the adjacent track, the access time to the last written sector for each band is:

4 msec + 16.7 msec + 1 msec = 21.7 msec.

Therefore, the time consumed for all bands becomes:

117.7 msec + (21.7 msec × 62) = 1463.1 msec.

That is, totally it takes about 1.5 sec.

As a result of completion of the foregoing processing steps the following information has been written into the RAM 8 of the controller 10 for all bands of the designated optical disc: the first track of every area, information indicating the correspondence of the sectors in the replacement areas to the replaced sectors in the user areas, and the address information of the last written sectors in the map areas. Because the data reading and the data writing after the completion of the above procedure can be carried out in the same manner as the conventional autochanger, it is possible to reduce the time of more than 8 sec which was necessary to read the defect management information in the prior art to about 1.5 sec.

Next, the case in which the defective sector is found when data are written into the user area will be explained. The operation of rewriting the data into the sector with the smallest address among the non-written sectors in the replacement area and the operation of additionally writing the resultant new defect management information into the sector next to the last written sector in the map area, are carried out in the same manner as the conventional method.

On the other hand, according to the present invention, in addition to the above operations the address information of the last written sector in the non-volatile memory IC 9 which corresponds to the sector in the band into which the data have just been written, is renewed. In this manner, the data in the non-volatile memory IC 9 are always renewed to the latest address information, so that there is no need to carry out any special initialization steps after turning-on of the system.

Although the foregoing description has been made for the write-once type optical disc, the erasable-rewritable type optical disc may be used in the present invention. In the erasable-rewritable optical disc, as the data in the sector in the map area can be rewritten, theoretically the map area of one band can be consist of only one sector, it is basically not necessary to search the last written sector. However, when the format interchangeability between the optical discs of write-once type and erasable-rewritable type is required, the advantage similar to that of the above embodiment can be obtained.

In the foregoing embodiment, the description is made for the case where following the reading-out of the control tracks the latest defect management information of all bands are read out. Another method may be employed, where the latest defect management information of the band designated by the reading-out command or writing-in command from the host computer 6 is read out. In this method, only when the first command is given to a certain band the extra time is necessarily consumed to read the last written sector of that band ((the average seeking time)+(average rotation-waiting time)+(1-sector-reading time)=117.7 msec)). However, when the second command or the command after the second is given to the same band the above extra time is not required. With this method, according to the present invention, the time corresponding to maximum 3.5 rotations (about 100 msec) can be saved for each band because the last written sectors in the map areas are previously known.

As described above, according to the present invention, the address information of the sectors in which stored is the latest defect management information of the optical discs which are accommodated and arranged in the autochanger is stored in the erasable type non-volatile memory means, and when the defective sector is found during the writing operation the address information stored in the erasable type non-volatile memory means is renewed. Therefore, the actual loading time of the disc can be much shortened. Moreover, as no special data are additively written into the optical disc, it is possible to obtain the changeability between two disc apparatuses with the same format of the optical disc.

What is claimed is:

1. An autochanger of writable discs, comprising:
   a plurality of writable discs for storing data, wherein each of said writable discs has user areas for storing said data, replacement areas for storing said data upon the occurrence of a defective sector in said user area, and map areas for storing defect management information;
   a disc accommodation unit for accommodating, in order, said plurality of discs;
   recording/reading device for recording said data into said writable disc and reading recorded data from said writable disc by accessing prescribed addresses of said writable disc while avoiding defective areas of said writable disc by referencing latest defect management information;
   a loading mechanism for automatically transferring said writable disc between said disc accommodation unit and said recording/reading device;
   a controller for controlling said loading mechanism, said recording/reading device, and erasable non-volatile memory means; and
   said erasable non-volatile memory means for storing address information of sectors storing said latest defect management information, said stored address information being renewed when a new defective sector is found.

2. An autochanger of writable discs as claimed in claim 1, wherein
   said controller further stores said address information read from said erasable non-volatile memory means into a RAM which is equipped in said controller.

3. An autochanger of writable discs as claimed in claim 1, wherein said erasable non-volatile memory means stores said address information read from said writable disc in a process of newly accommodating each of said writable discs into said disc accommodation unit.

4. An autochanger of writable discs as claimed in claim 1, wherein said writable disc is a write-once type optical disc.

5. An autochanger of writable discs as claimed in claim 1, wherein said erasable non-volatile memory means is a non-volatile memory IC.

6. An autochanger of writable discs as claimed in claim 1, wherein said erasable non-volatile memory means is equipped in said controller.

7. An autochanger of writable discs, comprising:
   a plurality of writable discs for storing data, wherein each of said writable discs has user areas for storing said data, replacement areas for storing said data upon the occurrence of a defective sector in said user area, and map areas for storing defect management information;
   a disc accommodation unit for accommodating, in order, said plurality of discs;
   recording/reading device for recording said data into said writable disc and reading recorded data from said writable disc by accessing prescribed addresses of said writable disc while avoiding defective areas of said writable disc by referencing latest defect management information;

a loading mechanism for automatically transferring said writable disc between said disc accommodation unit and said recording/reading device;

a controller for controlling said loading mechanism, said recording/reading device, and erasable non-volatile memory means, and said controller further stores said address information read from said erasable non-volatile memory means into a RAM which is equipped in said controller, wherein said controller controls said recording/reading device on the basis of information including said address information stored in said RAM in order to read said latest defect management information from said writable disc; and said erasable non-volatile memory means for storing address information of sectors storing said latest defect management information, said stored address information being renewed when a new defective sector is found.

* * * * *